June 19, 1951  F. T. POWERS, SR  2,557,561
PLATE POWDERING MACHINE
Filed Sept. 30, 1948  8 Sheets-Sheet 2

INVENTOR.
FRANK T. POWERS, SR., DECEASED.
BY. FRANK T. POWERS, JR. AND
JOHN N. POWERS. EXECUTORS.
BY
Morgan, Finnegan + Durham
ATTORNEYS.

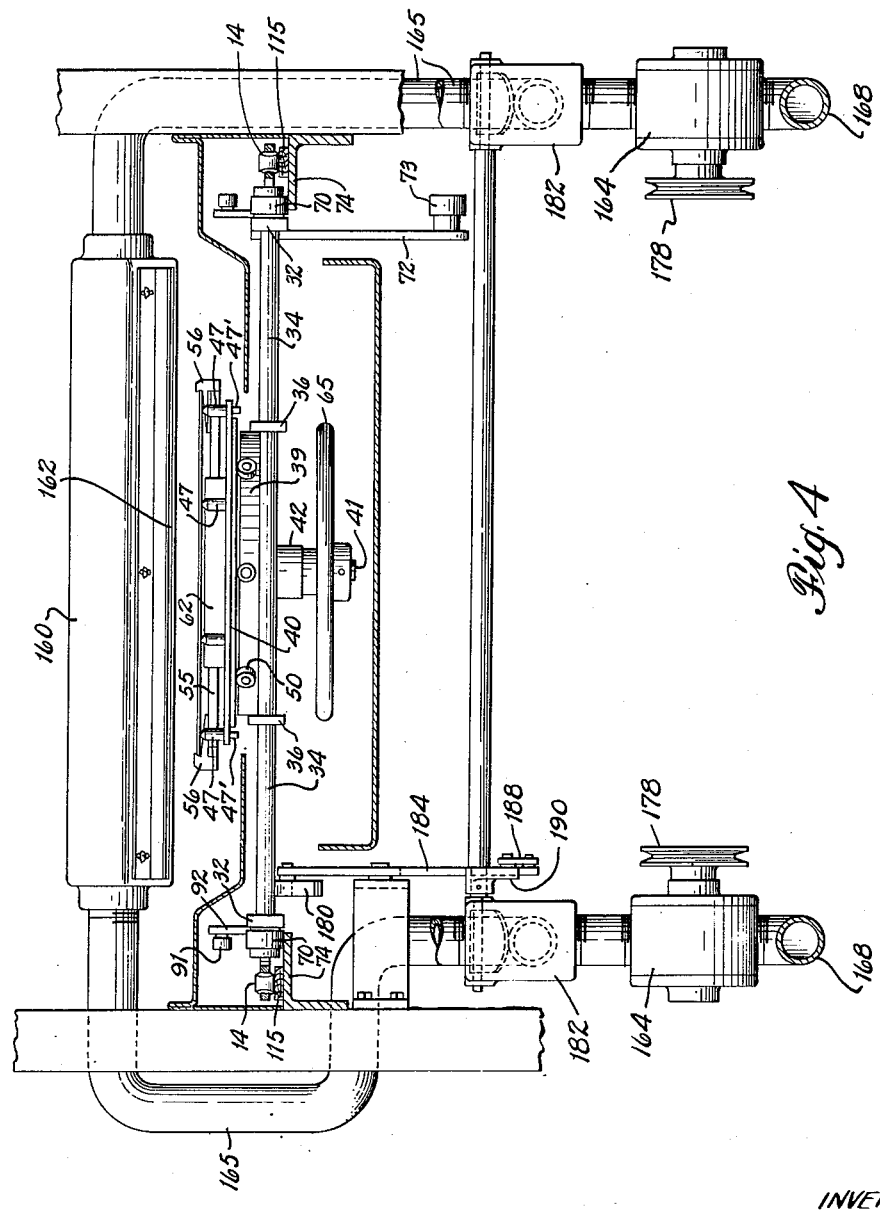

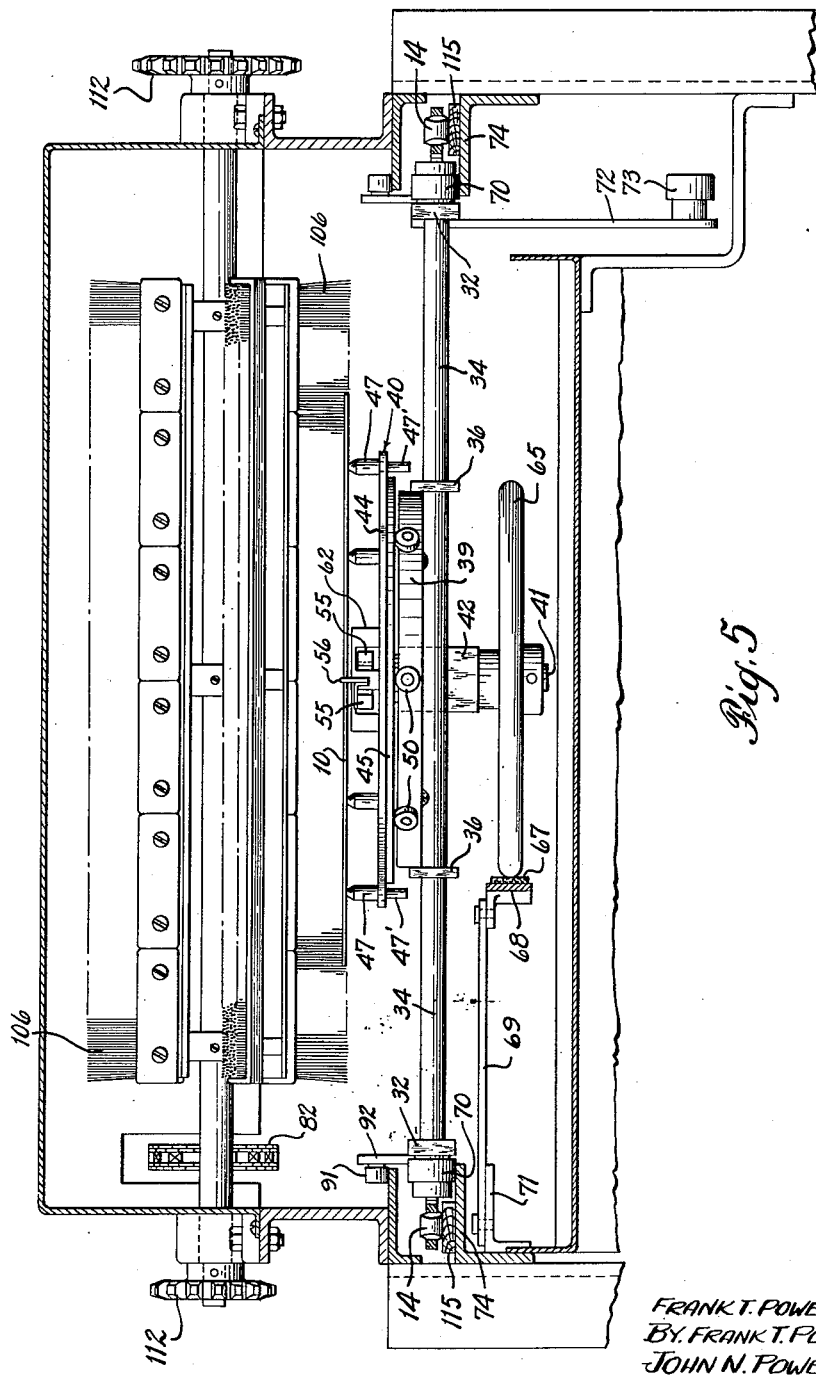

June 19, 1951 F. T. POWERS, SR 2,557,561
PLATE POWDERING MACHINE
Filed Sept. 30, 1948 8 Sheets—Sheet 5
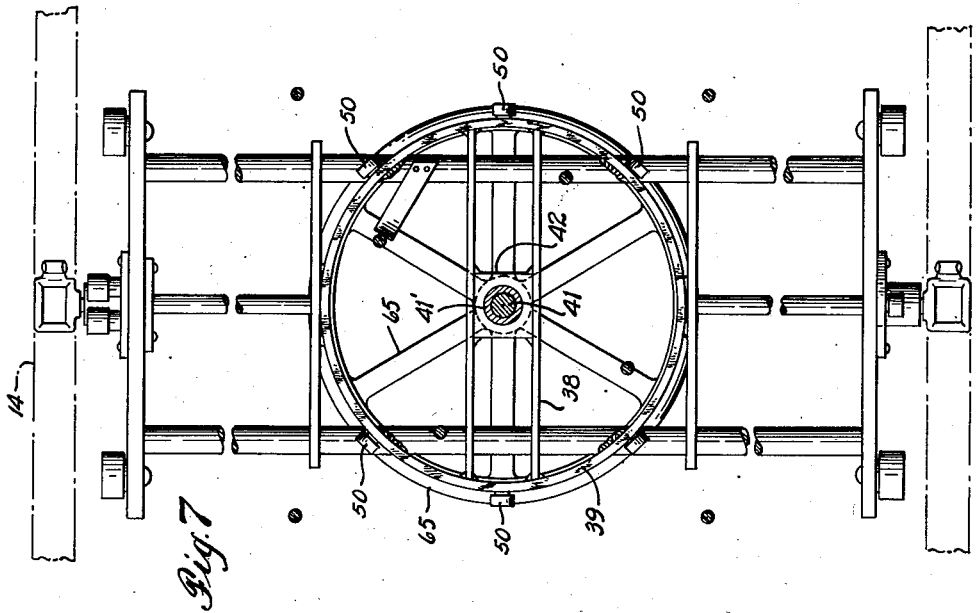
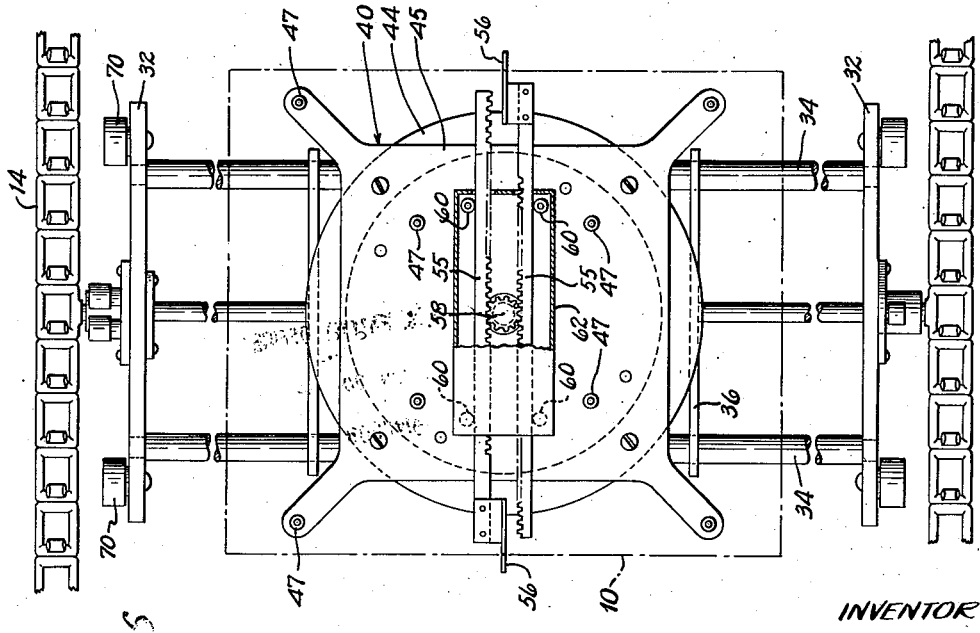
INVENTOR.
FRANK T. POWERS, SR. DECEASED,
BY FRANK T. POWERS, JR. AND
JOHN N. POWERS, EXECUTORS
BY
Morgan, Finnegan & Durham
ATTORNEYS.

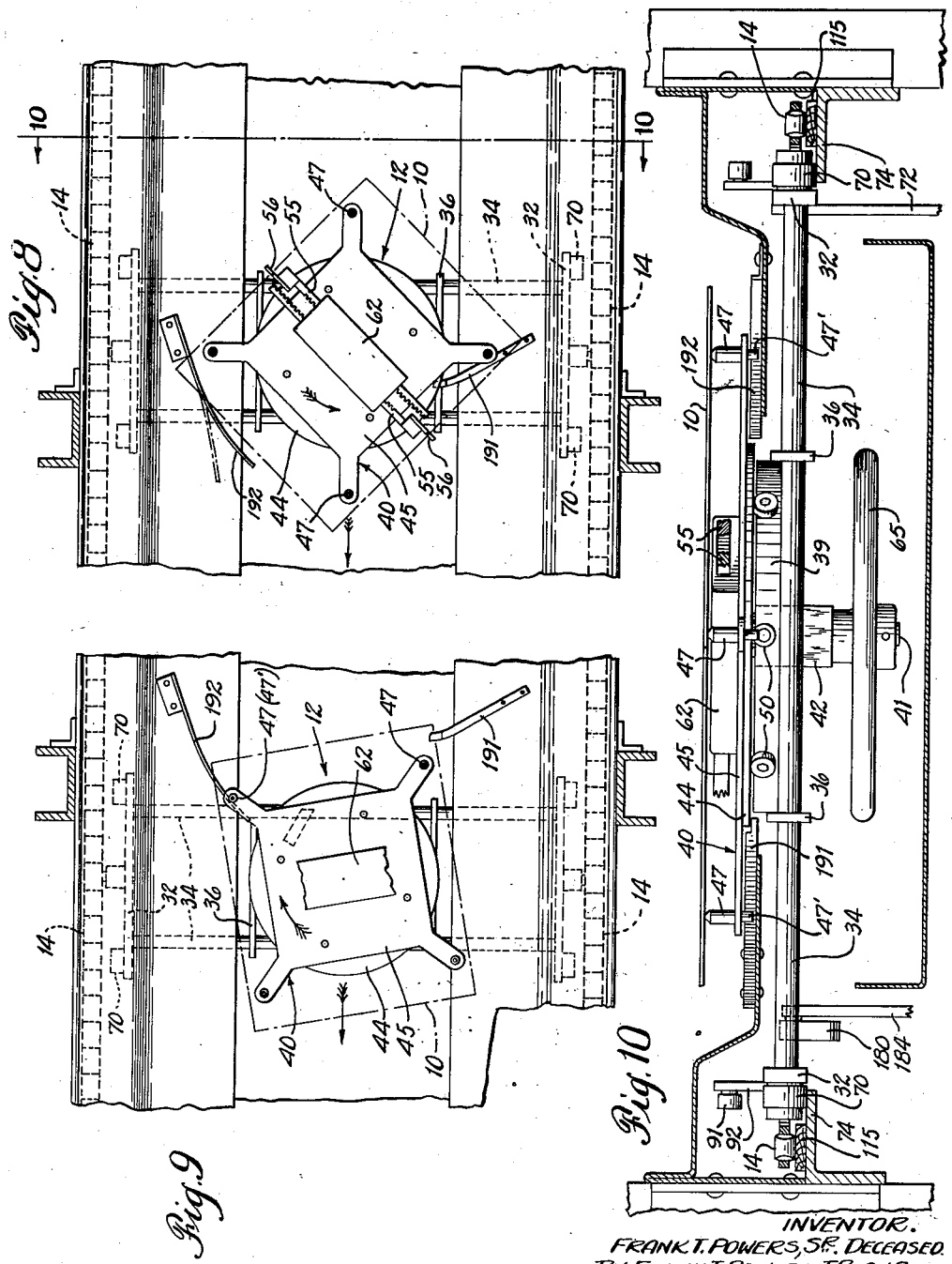

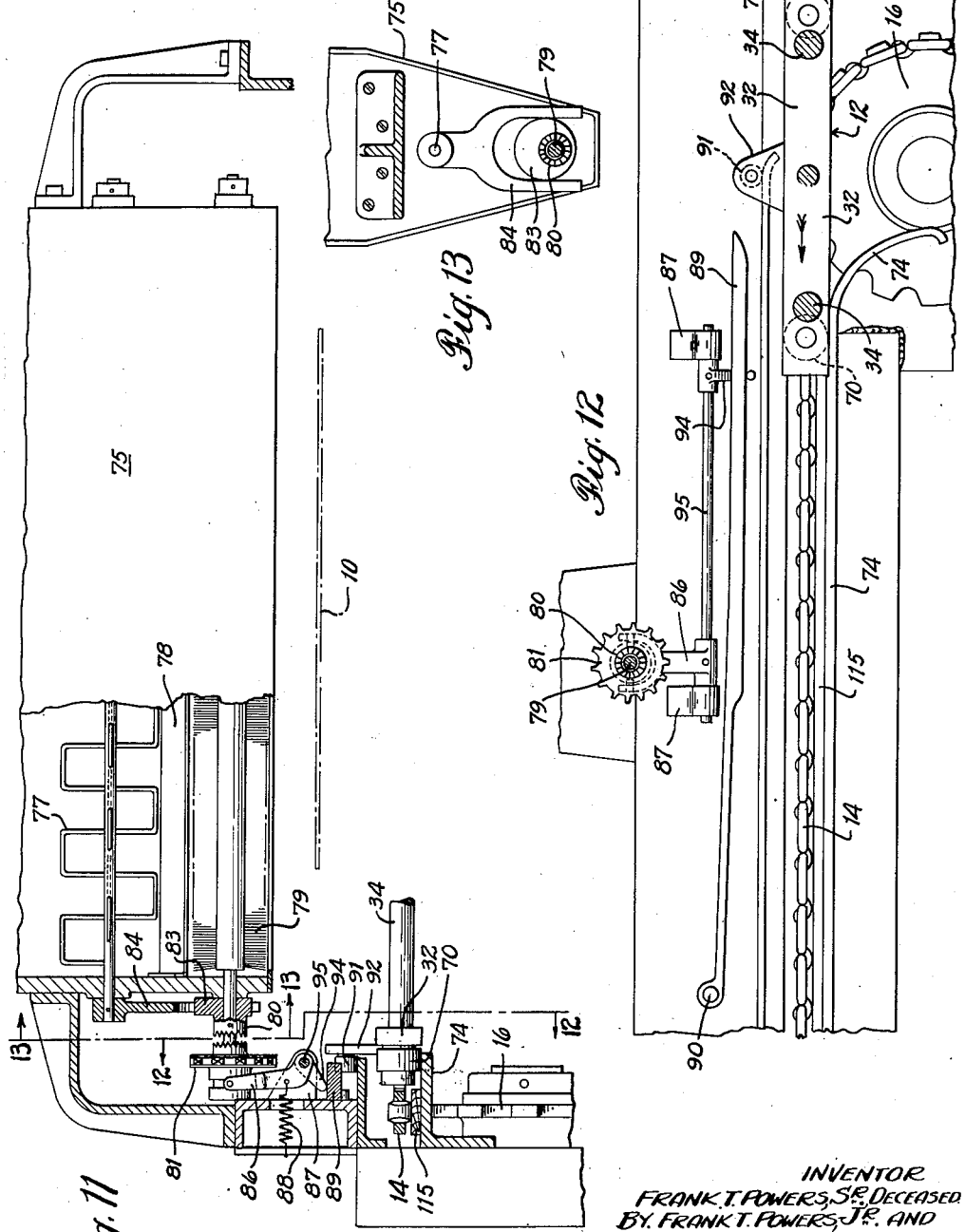

June 19, 1951  F. T. POWERS, SR  2,557,561
PLATE POWDERING MACHINE

Filed Sept. 30, 1948  8 Sheets-Sheet 8

INVENTOR.
FRANK T. POWERS, SR, DECEASED.
BY FRANK T. POWERS, JR. AND
JOHN N. POWERS. EXECUTORS
BY
Morgan, Finnegan & Durham
ATTORNEYS.

Patented June 19, 1951

2,557,561

UNITED STATES PATENT OFFICE 2,557,561

PLATE POWDERING MACHINE

Frank T. Powers, Sr., deceased, late of Glen Cove, N. Y., by Frank T. Powers, Jr., Locust Valley, and John M. Powers, Glen Cove, N. Y., executors, assignors to Powers Photo Engraving Company, a corporation of New York Application September 30, 1948, Serial No. 51,963

15 Claims. (Cl. 91—59)

The present invention relates to a novel and improved apparatus for powdering photoengravings.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate the preferred embodiment of the invention, and together with the description, serve to explain the principles of the invention.

Of the drawings:

Figure 4 is a transverse vertical section on line 4—4 of Figure 2 with conventional frame and supporting means mostly omitted and showing the plate cooling and drying mechanism and its controlling means;

Figure 5 is a transverse vertical section on line 5—5 of Figure 1 showing the plate carriage and plate beneath one of the rotating brushes;

Figure 6 is a plan view of plate carriage and associated conveyor chain with the position of the plate indicated in dot and dash lines;

Figure 7 is a plan view of plate carriage with rotatable plate supporting element removed to illustrate the under-structure;

Figure 8 is a plan view of plate carriage and associated parts of the machine at the plate turning station and showing the carriage table and plate (dot and dash lines) midway in their quarter-turn rotation;

Figure 9 is a view similar to Figure 8 but showing the carriage table and plate at a point in their turning operation wherein a small reverse rotation is to be started to compensate for whatever rotation over 90° previously took place;

Figure 10 is a transverse vertical section on line 10—10 of Figure 8 to show relation of turning fingers in relation of carriage table;

Figure 11 is a transverse vertical section on line 11—11 of Figure 1 partly in elevation and partly broken away and showing powder feeding mechanism associated with the powder storage bin or hopper;

Figure 12 is a longitudinal vertical section on line 12—12 of Figure 11 showing hopper operating mechanism in disengaged position and the plate carriage about to travel beneath it and cause it to engage and feed powder onto the plate;

Figure 13 is a section on line 13—13 of Figure 11 showing means for oscillating powder agitating shaft;

Figure 1:
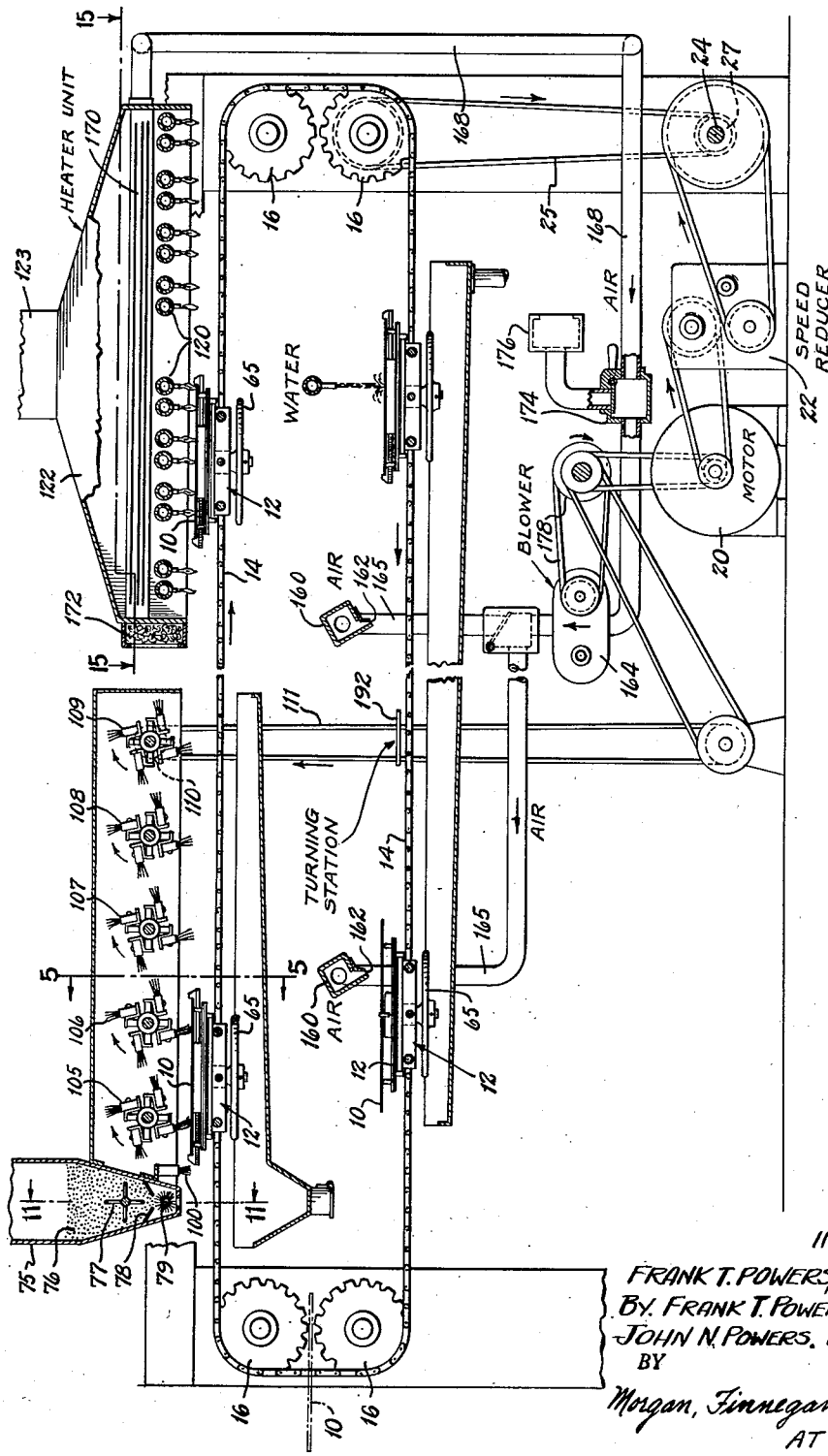
Figure 1 is a schematic view showing a longitudinal, vertical section taken along a central plane of a typical and illustrative embodiment of the present invention, most of the supporting and frame members being omitted, but the elements being shown in their operative relationship.

The present invention has for its object the provision of a novel and improved mechanism for mechanically applying powdered resin to the initially etched face of a halftone or line photoengraving, and for carrying out in a predetermined sequence those steps necessary to render the plate suitable for further etching. A further object of the invention is to provide an improved plate powdering machine which will rapidly perform the operation of "powdering four ways" in a uniform manner so that the etching of the plate may be more precisely standardized. Still another object of the invention is the provision of an improved machine for powdering a photoengraved plate four ways and in which the danger of overheating and uneven cooling are substantially eliminated.

In accordance with the preferred embodiment of the present invention, the plate is mounted upon a rotatable carrier which carries the plate through the machine while the various operations are performed on the plate, the carrier passing through the machine four times and being turned one-quarter turn after each passage so that a different edge of the plate is presented as the leading edge on each passage of the carrier through the machine. The carrier is preferably mounted on a conveyor chain so as to hold the plate always in a horizontal position, the carrier being rotatable after each passage through the machine, but otherwise securely holding the plate in a fixed position during each passage through the machine, and including means for engaging the plate securely during such passage without danger of damage to the face of the plate and also without danger of buckling the plate.

Initially a quantity of powdered etching resin, such as dragon's blood, is uniformly distributed over the etched upper surface of the plate, and as the plate moves forward it is subjected to the action of a plurality of soft brushes rotating at progressively increasing speeds. These brushes sweep the powdered resin across the plate from the leading edge toward the rear edge of the plate, cleaning out the powder from the etched portions of the plate, but at the same time leaving the sides of the etched portions covered with powdered resin which has been pressed against the edges of the etched portions of the plate and is banked so as to completely cover and protect these edges from undercutting during the subsequent etching process. The excess powder removed from the surface of the plate may be returned to a hopper so that it may be redistributed over other plates.

The plate having the powder banked against the rear sides of the etched portions is then subjected to intense heat, preferably in the form of a large number of substantially uniformly distributed gas burners directed downwardly toward the etched and powdered face of the plate, the intensity of the heating and the period of heating being sufficient to properly melt the resin and cause it to stick to the forward side of the lines and dots, that is to the rear side of the etched portions. After the powdered resin has been heated sufficiently to melt it to the proper degree, the plate is rapidly cooled and for this purpose is first subjected to a spray of a liquid cooling agent which does not harm the resin, such as water. The plate is further cooled and dried by being subjected to strong blasts of air directed at an oblique angle to the surface of the plate, the velocity of the air being sufficiently rapid so that a large portion of the cooling liquid is forcibly blown from the surface of the plate while the remainder is evaporated from the surface by the rapid current of air over the surface of the plate.

During the cooling operation the plate is turned one-quarter of a revolution so that another edge becomes the leading edge and this is preferably done between successive air blasts against the surface of the plate, thereby avoiding the possibility that any traces of the cooling liquid remain trapped on the rear sides of the etched portions of the plate.

The plate which has thus been powdered, heated to melt the resin, and cooled to set the resin is again passed through the machine and this process is repeated, each time with a different edge of the plate being the leading edge until the plate has passed through the machine four successive times, thereby accomplishing the operation of powdering four ways.

Means are provided for timing the discharge of powder from the hopper so that the powder is released therefrom only during the passage of the plate beneath the hopper, and other means are provided for collecting the excess of powder and continuously returning it to the hopper so that waste of the powder is avoided. Other means are provided for timing the heating means so that the heaters operate at full intensity only while the plate is passing through the heating means and is being heated thereby. Likewise the various cooling means are arranged for timed intermittent operation so as to conserve the amount of water and compressed air used in their operation.

The plate carrier comprises a plurality of members for engaging the edges of the plates adjustable to take plates of widely different sizes, and so arranged that they are brought to plate securing position by the operation of a common means which is preferably manually operated in normal operation, but is also mechanically actuated by the forward movement of the plate so that the plate is secured to its carriage even if the operator neglects to tighten the plate securing means.

While the preferred embodiment has been described with reference to a single plate carrier, there are preferably provided a plurality of such carriers so that a corresponding plurality of plates may be operated on in the machine simultaneously, one plate being powdered while another is heated and a third cooled, or while one plate receives its first powdering operation in one passage through the machine, the others receive their second, third or fourth powdering operation during the same passage.

It will be understood that the foregoing general description and the following detailed description as well are exemplary and explanatory of the invention but are not restrictive thereof.

Referring now in detail to the present illustrative and preferred embodiment of the invention as shown in the accompanying drawings, the photoengraved plate to be treated is designated as 10, and is secured to a plate carrier 12 mounted on and moved by a conveyor chain 14. The conveyor chain is arranged to run in a generally rectangular path including relatively long upper and lower reaches and relatively short vertical reaches. The chain is guided in this path by means of the sprockets 16 which are suitably journalled in the machine frame, one of the sprockets being driven from a suitable source of power such as motor 20 through a speed reducer 22. A similar conveyor chain 14 is provided near the other side of the machine and is supported by a similar set of sprockets driven from the same source of power, the two chains 14 moving at the same speed by reason of the driven sprockets for each chain being individually driven by chains 25 and sprockets 27 secured on driven shaft 24.

The plate carrier 12 is shown in detail in Figures 4 to 10, and four such carriers are shown in the present embodiment of the invention. Each of the carriers 12 comprises a frame carried between the two conveyor chains 14, and pivoted thereto so that the frame may always remain in a position to carry the plate in a generally horizontal position. Each frame comprises end members 32 parallel to each other and supporting cross bars 34 between which are mounted bars 36 supporting a spider 38 fixed thereon and having an annular rim 39. A second spider 40 is mounted directly above the spider 38 and is rotatable with respect thereto by means of a downwardly extending hollow shaft 41' which is journalled in the hub 42 of spider 38. The spider 40 comprises a circular plate 44 to which is secured an X-shaped plate 45, the X-shaped plate being provided with a plurality of upwardly extending pins 47 the upper ends of which terminate in a single plane and provide a level support for the photoengraved plate 10. Antifriction leveling means are provided between the spider 38 and the circular plate 44 of spider 40. These antifriction means comprise a plurality of rollers 50 mounted on horizontal studs which are radially positioned with reference to the spider 38 and project slightly above the upper surface of the annular rim 39 so as to contact with the underside of the circular plate 44 and permit it to be easily rotated.

Means are provided for securely engaging the photoengraved plate 10 as it is carried on the pins 47. For this purpose a pair of racks 55 are slidably mounted parallel to each other and closely adjacent to a diameter of the circular plate 44. An outer end of each rack 55 is formed with a sheet metal hook 56 which extends upwardly so as to engage the photoengraved plate by its opposite edges as the plate rests on the pins 47. Racks 55 have their toothed surfaces facing each other and mesh with opposite sides of a pinion 58 formed on the upper surface end of shaft 41, so that rotation of the shaft 41 causes the racks 55 to be moved in opposite directions to an equal extent and as the hooks 56 are moved toward each other, the plate 10 is brought to a central position with respect to the plate carrier. For slidably mounting the racks 55 and holding them in parallel position, a plurality of rollers 60 are rotatably mounted on the upper face of plate 45 and preferably two such rollers, one at either side of the pinion 58, are positioned to engage the outer faces of the racks 55. A cover 62 is preferably provided above the racks 55 so as to prevent their movement away from the plate 45, as well as to exclude excessive dust and powdered resin from the teeth of racks 55 and pinion 58.

Figures 2, 3:
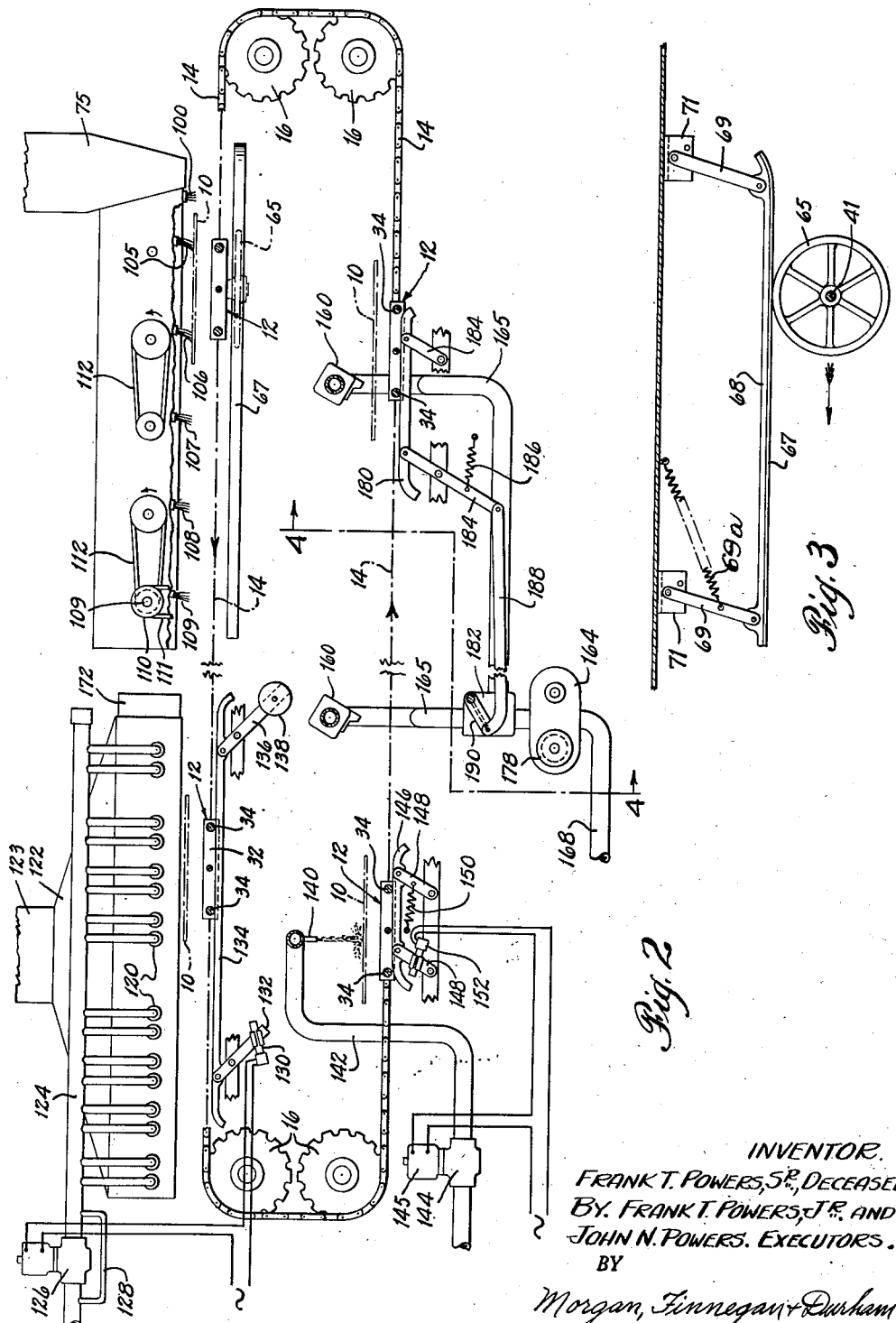
Figure 2 is a view similar to Figure 1 but taken from the opposite direction with some parts in elevation and showing in diagrammatic form the mechanism for controlling the various steps of operation.
Figure 3 is a top plan section of means for insuring tightness of the plate carriage.

Below the cross bars 34, and at the lower end of shaft 41 is provided a hand wheel 65 by which the pinion 58 may be turned as the plate is initially secured to its carrier. As shown in Figures 3 and 5, hand wheel 65 is of such a dimension and is so positioned that it may engage with a longitudinally extending strip of friction material 67 which is mounted on a bar 68 extending parallel to the path of the plate carrier and is mounted and resiliently projected into the path of the hand wheel 65 by means of links 69 and tension spring 69a. Links 69 are pivoted to the bar 68 near its ends and to brackets 71 mounted on a side frame of the machine, as shown in Figure 3. As the plate carrier moves forward, hand wheel 65 drags against the friction material 67 and the plate engaging hooks 56 are urged together until they are tight against opposite edges of the plate, and this action takes place even if the hand wheel 65 was not initially sufficiently tightened.

The plate carrier is pivotally mounted with respect to the conveyor chains 14, and the end members 32 are provided with rollers 70 projecting therefrom toward their respective chains 14, and one of the end members 32 is provided with a depending arm 72 having a roller 73 mounted at the lower end thereof. These rollers 70 and 73, cooperating with trackways 74 formed along the path of movement of the carrier, serve to prevent tilting movement of the plate carrier with respect to the machine as a whole so that the plate 10 is always maintained horizontal.

Means are provided for initially applying powdered resinous material to the upper surface of the plate, and for this purpose a hopper 75 is provided above the path of the plate. The hopper 75 is charged with a quantity of suitable powder 76 such as dragon's blood, and within the hopper is provided an agitator 77 which prevents packing of the powder and allows a small quantity of it to fall through the slot between the adjacent strips 78 near the bottom of the hopper. Beneath the slot is mounted a rotatable distributing brush 79 which insures a relatively slow, uniform discharge of powder from the hopper onto the surface of the plate.

In order to prevent waste of powder, and to limit the discharge of powder to those times when a plate is beneath the hopper, clutch means are provided between the brush 79 and agitator 77 and illustratively comprise a dog clutch 80 on the shaft of brush 79, the axially movable portion of the clutch being formed as part of the hub of sprocket 81, which sprocket is driven through a chain 82, from motor 20. The hub of the part of clutch 80 fixed to the shaft of brush 79 is formed as an eccentric 83 which rocks in a fork 84 mounted on the end of the shaft of agitator 77 so that rotation of the brush 79 causes oscillation of the agitator 77.

For controlling the axial movement of sprocket 81 and thereby the drive of agitator 77 and brush 79, pivoted clutch fork 86 is mounted on a side wall bracket 87 and is normally held in clutch disengaging position by tension spring 88, but is moved to clutch engaging position as the plate begins to pass beneath the hopper by means of shoe 89 pivoted at 90 on a side wall of the machine and raised by roller 91 projecting from an upwardly extending bracket 92 formed on one of the end members 32. Shoe 89 engages with a finger 94 carried by rock shaft 95 to which the clutch fork 86 is also fixed, and shoe 89 is so shaped and located that discharge of the powder from the hopper 75 onto the upper face of plate 10 continues throughout the entire passage of the plate beneath the hoper.

On the forward wall of hopper 75 is a stationary brush 100 which serves to smooth out any irregularities in the powder as deposited on the plate 10, and initially drags the powder toward the rear of the plate, removing from the plate a considerable portion of the powder applied to it. Thereafter the surface of the plate is subjected to the action of a plurality of rotating brushes each of which sweeps the powder across the surface of the plate toward the rear edge thereof, the several rotating brushes operate at progressively increasing speeds so that more and more of the powder is removed from the surface of the plate, and the powder remaining on the surface is progressively compacted against the rear edge of the etched portions of the plate, that is against the forward sides of the dots, lines or other unetched portions of the plate.

In the use of the machine, the first powdering operation on the plate is usually accomplished after the plate has been given an initial "bite," at which time the depth of the etched portions is of the order of $1/1000$ of an inch. The machine also operates on plates after they have been etched a plurality of times, and in many cases the depth of the etching at the time of the final powdering operation may be as great as $10/1000$ of an inch or even greater.

The rotatable brushes comprise a plurality of axially extending rows of bristles, the bristles being fairly long and flexible, and positioned so that they lightly engage the upper surface of the plate as they rotate, and also so that at their lowermost point the bristles extend outwardly and rearwardly with respect to their rotational movement, thereby flexing at the point of contact with the plate and pushing the powdered resin against the etched sides. Four axially extending and parallel sets of bristles are preferably provided on each of the rotating brushes.

Figure 14:
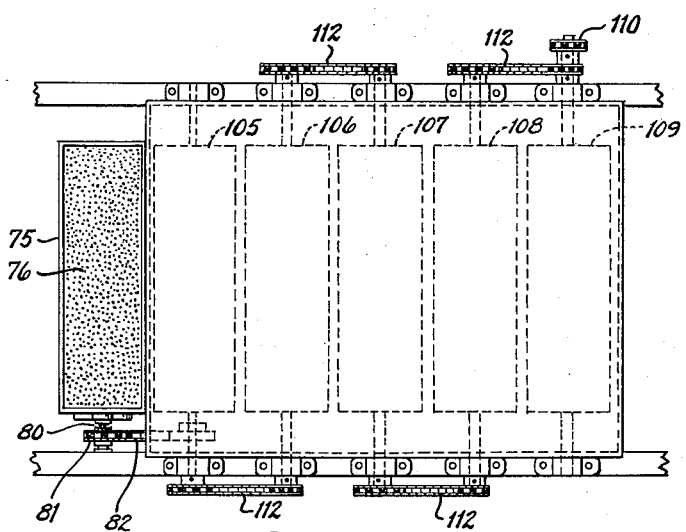
Figure 14 is a plan view of hopper and rotating brush housing showing the related means for driving the rotating brushes and the hopper mechanism.
Figure 15:
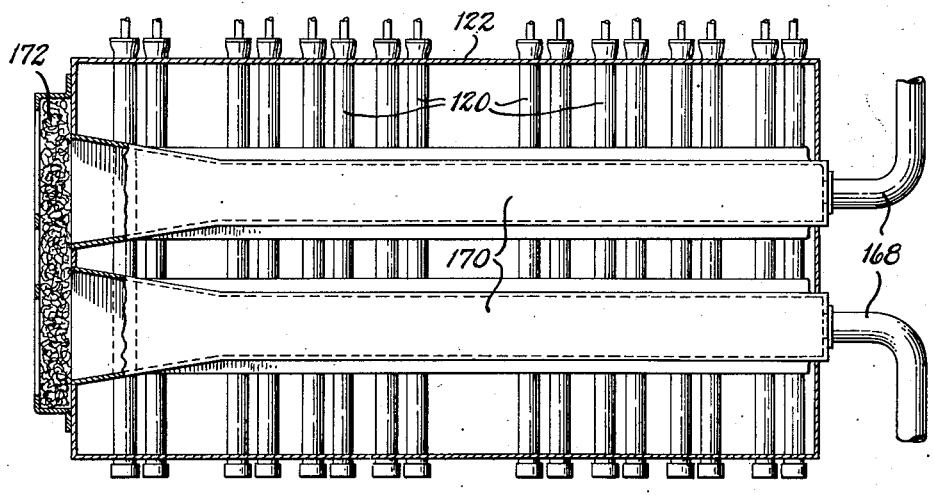
Figure 15 is a plan section on the line 15—15 of Figure 1 of the heating unit to show the air filtering and heating means associated therewith for the air which is subsequently used for drying the plates after their passage beneath the water bath.

As embodied there are provided five such rotatable brushes 105, 106, 107, 108 and 109 mounted on shafts which are parallel to each other and positioned above the path of the plate 10, one such brush and its mounting being shown in Figure 5 while Figure 14 shows the interconnection of the brushes for driving them at increasingly faster speeds. On the end of the shaft of brush 109 is provided a sprocket 110 driven by chain 111 from motor 20, and chain drives 112 serve to drivingly interconnect the brushes with each other. In actual practice brush 105 is rotated somewhat less than 100 R. P. M. while brush 109 rotates at about 200 R. P. M. By the time the plate has completed its passage beneath brush 109, all of the surplus powder has been removed from the surface of the plate leaving the flat bottom portions of the etched areas free from any trace of powdered resin.

Means are provided for supporting the conveyor chains 14 so as to prevent sagging of the chain and for this purpose rub rails 115 extend horizontally for substantially the full length of the machine along both the upper and lower reaches of the chains and serve to support the chain against vertical movement.

After the powdering and brushing operations have been completed, the plate 10 is conveyed beneath a series of heating units which are adapted to rapidly melt the dragon's blood remaining on the surface of the plate and protecting the edges of the etched portion. As embodied, there are provided a large number of gas heaters 120 each of which provides a large number of flames in a path extending across the path of movement of the plate, the several heating units 120 being arranged parallel to each other and spaced along the path of travel of the plate, preferably above but closely adjacent to the plate.

The gas heating units 120 are enclosed within a hood 122 provided with a ventilating duct 123 through which most of the gas and heated air are conveyed away from the machine. Gas is supplied to the heating tubes 120 from a common source 124 under control of the electromagnetic valve 126 which normally closes so that the burners 120 burn only at low intensity on gas supplied through the valve bypass 128.

Means are provided for automatically opening the valve 126 as the leading edge of the plate 10 comes into heating position with respect to the heating units 120 and these means also maintain the heating units 120 in operation until the plate has completely passed out of the range of the heaters. For this purpose valve 126 is closed by mercury switch 130 mounted on link 132 and normally held in open circuit position, being tilted to closed circuit position by movement of rail 134 which is also supported by means of link 136, and is returned to its upper position by means of counter-weight 138. As the plate carriage moves the plate beneath the heating units 120, rail 134 is engaged by one of the rods 34 of the plate carriage so as to depress the rail thereby swinging the link 132 and tilting switch 130 to circuit closed position. Rail 134 is maintained in this lower position until the other rod 34 of the plate carriage has cleared the far end of the rail 134, at which time the counterweight 138 causes the rail 134 to be raised to open switch 130 thereby diminishing the supply of gas to the heaters 120.

The plate carriage then descends and is carried along in a reversed direction along the path of the lower reach of the chain 14, and positions the plate below the spray nozzles 140 which spray water from pipe 142 under the control of the electromagnetic valve 144. Valve 144 is controlled in its opening and closing by rail 146 which engages with the rods 34 of the plate carriage, and is mounted to be raised and lowered on the parallel links 148, links 148 being pivoted at their upper ends to rail 146 and at their lower ends to a part of the frame. Links 148 are urged to raise the rail 146 by means of tension spring 150. On one of the links 148 is mounted a tiltable mercury switch 152 in circuit with the valve solenoid 145 so that valve 144 is opened while rail 146 is depressed by either of the plate carriage rods 34.

The spray from nozzle 140 is preferably a relatively fine water spray forcefully directed toward the surface of the plate 10, and to secure better distribution a plurality of the nozzles 140 may be provided spaced evenly across the path of travel of the plate 10.

The cooled and wet plate then passes beneath a plurality of high speed jets of air which are directed at an oblique angle with respect to the surface of the plate 10, thereby blowing the major portion of the water from the surface of the plate, and evaporating the remainder of the water by the rapid circulation of air over the surface of the plate, which may still be moist.

In order to improve the elimination of moisture from the surface of the plate, particularly where the etching is of considerable depth, and some moisture might be trapped on the rear edges of the etched portions, a plurality of such air blasts are provided, and the plate is rotated in its own plane intermediate the air blasts. For this purpose, each of the air blasts comprises a chamber 160 having a narrow slot 162 extending at least across the width of the plate, and supplied with relatively high pressure air from blower 164 through pipe 165. It is preferred to use relatively high velocity air in order to increase the mechanical removal of the water from the surface of the plates.

The air supplied to the plates may be air at room temperature or if desired this air may be heated, and for that purpose is drawn through a pipe 168 which is connected with flues 170 extending along the upper part of the heater canopy 122 so that the air in them is heated by the heat from the gas heater units 120. The outer ends of the flues 170 preferably terminate in a dust filter 172 so that the air supplied to the cooling nozzles 160 is relatively clean. A manually actuated valve 174 alternatively connects the pipe 168 with an air filter 176 through which unheated air may be taken into the blower 164.

As embodied two blowers 164 are provided, one at either side of the machine, both being driven from the motor 20 in any desired manner, as by belts and pulleys 178. Normally, air nozzle 160 is in operation, but after the plate has passed beneath the first air nozzle 160, and while the plate is passing beneath the second air nozzle 160, the rods 34 of the plate carriage depress rail 180 to switch valve 182 so that air is supplied only to the second nozzle 160. Rail 180 is mounted by pivoted links 184 and is held in raised position by tension spring 186, one of the links being connected by link 188 to the lever 190 controlling the position of the valve member in valve 182. Spring 186 normally holds the valve 182 so that all of the air is supplied from both blowers to the first air nozzle 160, but while plate 10 is beneath the second air nozzle 160 rail 180 is depressed so that valve 182 is shifted to supply all of the air to the second of the two nozzles 160.

Means are provided intermediate the nozzles 160 for rotating the plate one quarter turn, and these means are shown in detail in Figures 8, 9 and 10. As the plate carriage moves along first through the position shown in Figure 8 and then through the position shown in Figure 9, the depending end 47' of one of the pins 47 engages with a slanted bar 191 mounted on the side frame of the machine. Forward movement of the plate carriage causes the carriage to be rotated slightly more than one quarter turn or until the depending end 47' slides off the end of the bar 191. Further movement of the plate carriage causes another one of the depending ends 47' to engage with the end portion of leaf spring 192, mounted on the other side of the frame of the machine. Leaf spring 192 is of such a length and stiffness that its engagement with the other end 47' causes a net rotation of the plate carriage of one quarter turn.

After the plate has been completely dried it and the plate carriage are again raised at the first end of the machine to the upper level, and the plate is carried through the machine a second time but with a different edge as the leading edge of the plate. When this operation has been repeated four times, the plate has been powdered in each one of four different directions, has been heated after each powdering to melt the dragon's blood, and has been cooled and dried after each melting so that the next application of dragon's blood adheres only in the desired parts of the plate.

After four passages through the machine, the operator removes the plate from the plate carriage by oppositely rotating the hand wheel 65, moving it to plate-releasing position, after which an additional plate may be placed on the carriage either during the same upward travel of the plate or after the plate carriage has passed through the machine without having a plate mounted thereon.

The invention in its broader aspects is not limited to the specific mechanisms shown and described but departures may be made therefrom within the scope of the accompanying claims without departing from the principles of the invention and without sacrificing its chief advantages.

What is claimed is:

1. In a plate powdering machine the combination of means for applying resinous powder to a partially etched photoengraving, means for removing surplus powder from the plate and for packing the retained powder against the sides of the etched portion of said plate, means for melting the retained resinous powder, liquid spray means for cooling the plate and high velocity air means for removing the liquid from the surface of the plate.

2. A plate powdering machine as claimed in claim 1 in which the high velocity air means comprises a plurality of long, narrow nozzles for directing a blast of air onto the surface of the plate, conveyor means are provided for moving the plate past the plurality of air nozzles and means are provided for partially rotating the plate about a vertical axis in its travel between air nozzles.

3. In a plate powdering machine for photoengraving, the combination of a plurality of long narrow air nozzles for obliquely directing blasts of air against the surface of a photoengraved plate, conveyor means for moving a photoengraved plate through said blasts of air and means for turning said plate about a vertical axis intermediate the first and last air nozzles.

4. A plate powdering machine as claimed in claim 3 in which the plate turning means including means on the conveyor and fixed means engaging therewith which cooperate to turn the plate one-quarter turn.

5. A plate powdering machine as claimed in claim 3 in which means are provided for alternatively supplying the air nozzles with unheated or heated air.

6. A plate powdering machine as claimed in claim 3 in which valve means, actuated by the travel of the plate, are provided for supplying air to the nozzles in succession as the plate passes adjacent the nozzles.

7. In a plate powdering machine for photoengraving, the combination of a moving conveyor, a support for a plate carried by the conveyor, means carried by the support for engaging opposite edges of the plate, a common operating means for moving the engaging means equally and in opposite directions and means actuated by the travel of the conveyor for moving the operating means to cause the engaging means to clamp a plate on the support.

8. A plate powdering machine according to claim 7 in which a hand wheel forms part of the common operating means and engages a stationary friction member to turn the hand wheel as the conveyor moves the plate support.

9. A plate powdering machine according to claim 7 in which means are provided for periodically rotating the plate support.

10. A plate powdering machine according to claim 8 in which means are provided for periodically rotating the plate support.

11. A plate powdering machine according to claim 9 in which the plate support is rotated by means of a stationary member engaging a portion of the moving plate support.

12. A plate powdering machine according to claim 10 in which the plate support is rotated by means of a stationary member engaging a portion of the moving plate support.

13. In a plate powdering machine including means for applying powder to a photoengraving plate to be etched, means for brushing the excess powder from the plate and for packing powder against the sides of the etched portions of the plate, and means for heating the plate to melt the powder, said means being arranged in one horizontal plane and means for applying cooling fluid to the plate to cool the plate, said cooling means being arranged in a lower horizontal plane beneath the first horizontal plane, a conveyor for moving a plate past and into cooperative relation to each of said means and means for turning the plate in a horizontal plane after each of the means has acted on said plate.

14. A plate powdering machine according to claim 13 in which the cooling fluid is a liquid and means are provided for removing the surplus fluid and for drying the plate.

15. In a plate powdering machine, the combination of a plate carrier, chain conveyor means for moving the carrier in an endless path comprising an upper horizontal path and a lower horizontal path, the two horizontal paths being arranged one above the other, and plate powdering means, brushing means, powder melting means, plate cooling means and air blast means being arranged to act on the plate as it is moved along said paths, said powdering, brushing and heating means acting on the plate along the upper path and the cooling and air blast means acting on the plate along the lower path.

FRANK T. POWERS, Jr.,
JOHN M. POWERS,
*Executors of the Estate of Frank T. Powers, Sr., Deceased.*

REFERENCES CITED

The following references are of record in the file of this patent:

UNITED STATES PATENTS

| Number | Name | Date |
|---|---|---|
| 800,225 | Levy | Sept. 26, 1905 |
| 1,283,155 | Goldhamer | Oct. 29, 1918 |
| 1,290,603 | Logan | Jan. 7, 1919 |
| 1,389,887 | Leyland et al. | Sept. 6, 1921 |
| 2,017,510 | Powers | Oct. 15, 1935 |
| 2,259,935 | Johnson | Oct. 12, 1941 |